US012641541B2

(12) United States Patent
He et al.

(10) Patent No.: US 12,641,541 B2
(45) Date of Patent: May 26, 2026

(54) LOW-POWER WAKE UP RADIO OPERATION IN WIRELESS COMMUNICATION

(71) Applicant: Apple Inc., Cupertino, CA (US)

(72) Inventors: Hong He, San Jose, CA (US); Dawei Zhang, Saratoga, CA (US); Fangli Xu, Beijing (CN); Haijing Hu, Los Gatos, CA (US); Haitong Sun, Cupertino, CA (US); Huaning Niu, San Jose, CA (US); Jie Cui, San Jose, CA (US); Oghenekome Oteri, San Diego, CA (US); Sigen Ye, San Diego, CA (US); Wei Zeng, Saratoga, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 733 days.

(21) Appl. No.: 17/904,629

(22) PCT Filed: Sep. 2, 2021

(86) PCT No.: PCT/CN2021/116290
§ 371 (c)(1),
(2) Date: Aug. 19, 2022

(87) PCT Pub. No.: WO2023/028958
PCT Pub. Date: Mar. 9, 2023

(65) Prior Publication Data
US 2024/0196328 A1 Jun. 13, 2024

(51) Int. Cl.
*H04W 52/02* (2009.01)
*H04B 17/318* (2015.01)
(Continued)

(52) U.S. Cl.
CPC ...... *H04W 52/0235* (2013.01); *H04B 17/328* (2023.05); *H04L 1/1812* (2013.01);
(Continued)

(58) Field of Classification Search
CPC ......... H04W 52/0235; H04W 72/1273; H04W 76/28; H04W 52/0229; H04W 52/028;
(Continued)

(56) References Cited

U.S. PATENT DOCUMENTS

2016/0345292 A1 11/2016 Ljung et al.
2019/0069231 A1 2/2019 Kneckt et al.
(Continued)

FOREIGN PATENT DOCUMENTS

CN 109429319 3/2019
CN 111034281 4/2020
(Continued)

OTHER PUBLICATIONS

Qualcomm, "Remaining issues of 6.2.6.3 Wake-up signal", 3GPP TSG RAN WG1, Meeting #94, R1-1807528, May 25, 2018, 12 sheets.
(Continued)

*Primary Examiner* — Edan Orgad
*Assistant Examiner* — Malick A Sohrab
(74) *Attorney, Agent, or Firm* — Fay Kaplun & Marcin, LLP

(57) ABSTRACT

A user equipment (UE) is configured to enter a radio resource control (RRC) state with a base station wherein network operations are performed using a main radio (MR), receive a first set of parameters from the base station for wakeup radio (WUR) state operation wherein the UE enables a WUR and powers down the MR to an off or deep sleep state, the first set of parameters including a parameter enabling the WUR state operation and a configuration of (Continued)

gNB 520

UE 505

MR 510

WUR 515

UE in RRC_CONNECTED state

WUR Request 525

SIB or dedicated RRC 530
1) Wake up Radio Enabling
2) WUR-RS configuration
3) RSRP threshold for WUR request

WUR-RS 535

540
1) Measurement Report (RSRP values)
2) WUR request

545
WUR Configuration/Setup (DRX configuration, frequency, location, BW, sequence ID, repetition number)

Switching Delay

HARQ-ACK 550

UE in 'WUR' state 555

WUR reference signaling (WUR-RS), receive a second set of parameters from the base station for WUR setup and a WUR signal (WUR-S) configuration and enter the WUR state from the RRC state, wherein, while in the WUR state, the UE performs uses the WUR including at least one of monitoring for the WUR-S, measuring the WUR-RS, or implementing a WUR discontinuous reception (DRX) cycle for WUR-S and WUR-RS signal monitoring.

19 Claims, 8 Drawing Sheets

(51) Int. Cl.

| | |
|---|---|
| *H04L 1/1812* | (2023.01) |
| *H04L 5/00* | (2006.01) |
| *H04W 72/1273* | (2023.01) |
| *H04W 76/28* | (2018.01) |

(52) U.S. Cl.
CPC ....... *H04L 5/0051* (2013.01); *H04W 72/1273* (2013.01); *H04W 76/28* (2018.02)

(58) Field of Classification Search
CPC ......... H04W 52/0216; H04W 52/0209; H04W 52/0212; H04W 52/0248; H04W 76/27; H04B 17/328; H04L 1/1812; H04L 5/0051; Y02D 30/70
See application file for complete search history.

(56) References Cited

U.S. PATENT DOCUMENTS

| | | | |
|---|---|---|---|
| 2019/0349857 A1 | 11/2019 | Kim et al. | |
| 2020/0022081 A1* | 1/2020 | Ljung | H04W 8/24 |
| 2020/0029276 A1 | 1/2020 | Kim et al. | |
| 2020/0092818 A1* | 3/2020 | Jiang | H04W 52/0261 |
| 2020/0178171 A1 | 6/2020 | Lou et al. | |
| 2020/0178178 A1 | 6/2020 | Huang et al. | |
| 2021/0014825 A1 | 1/2021 | Shi et al. | |
| 2022/0116876 A1 | 4/2022 | Sun et al. | |
| 2022/0141771 A1 | 5/2022 | Zhou et al. | |
| 2024/0147362 A1* | 5/2024 | Thyagarajan | H04W 52/0229 |

FOREIGN PATENT DOCUMENTS

| | | | | |
|---|---|---|---|---|
| CN | 111406429 | 7/2020 | | |
| CN | 111937446 | 11/2020 | | |
| CN | 112586049 | 3/2021 | | |
| WO | 2018/132100 | 7/2018 | | |
| WO | WO-2018132100 A1 * | 7/2018 | .......... | H04W 52/028 |
| WO | WO-2022135668 A1 * | 6/2022 | ........ | H04W 52/0229 |

OTHER PUBLICATIONS

Spreadtrum Communications, "UE power saving enhancements for R18", 3GPP TSG RAN Rel-18 workshop, RWS-210064, Jun. 7, 2021, 7 sheets.

* cited by examiner

Method 900

LOW-POWER WAKE UP RADIO OPERATION IN WIRELESS COMMUNICATION

TECHNICAL FIELD

This application relates generally to wireless communication, and in particular relates to Low-Power Wake Up Radio Operation in Wireless Communication.

BACKGROUND INFORMATION

A user equipment (UE) may establish a connection to at least one of a plurality of different networks or types of networks. In some networks, such as 5G New Radio (NR) and Long Term Evolution (LTE), a radio resource control (RRC) state model has been implemented as a power saving feature, wherein a device in the RRC_IDLE state or RRC_I-NACTIVE state performs a reduced set of network operations and consumes less power than when the device is in the RRC_CONNECTED state.

Devices operating in a 5G NR network may consume more power than devices operating in an LTE network due to factors such as the support of larger bandwidths, higher throughput, and higher frequencies for 5G communications relative to LTE communications. When a 5G-capable device is in the RRC_IDLE or RRC_INACTIVE state, a large amount of UE power may be consumed when a main radio (MR) of the device is in a deep sleep state and/or is used to perform RRM measurements. For example, the MR may be powered on periodically to perform the RRM measurements, thus impacting the power savings from powering down the MR.

SUMMARY

Some exemplary embodiments described herein are related to a processor of a user equipment (UE) configured to perform operations. The operations include entering a radio resource control (RRC) state with a base station wherein network operations are performed using a main radio (MR), receiving a first set of parameters from the base station for wakeup radio (WUR) state operation wherein the UE enables a WUR and powers down the MR to an off state or to a deep sleep state with reduced power consumption, the first set of parameters including a parameter enabling the WUR state operation for the UE and a configuration of WUR reference signaling (WUR-RS), receiving a second set of parameters from the base station for WUR setup and a WUR signal (WUR-S) configuration and entering the WUR state from the RRC state, wherein, while in the WUR state, the UE performs operations using the WUR including at least one of monitoring for the WUR-S, measuring the WUR-RS, or implementing a WUR discontinuous reception (DRX) cycle for WUR-S and WUR-RS signal monitoring.

Other exemplary embodiments are related to a processor of a base station configured to perform operations. The operations include entering a radio resource control (RRC) state with a user equipment (UE), wherein operations are performed by the UE using a main radio (MR), transmitting a first set of parameters to the UE for wakeup radio (WUR) state operation wherein the UE enables a WUR and powers down the MR to an off state or to a deep sleep state with reduced power consumption, the first set of parameters including a parameter enabling the WUR state operation for the UE and a configuration for WUR reference signaling (WUR-RS) and transmitting a second set of parameters to the UE for WUR setup and a WUR signal (WUR-S) configuration.

Still further exemplary embodiments are related to a processor of a user equipment (UE) configured to perform operations. The operations include determining that a wake-up radio (WUR) should be enabled, enabling the WUR and powering down a main radio (MR) and performing radio resource management (RRM) measurements for a serving cell based at least in part on signals received by the WUR while the WUR is enabled.

Additional exemplary embodiments are related to a processor of a user equipment (UE) configured to perform operations. The operations include determining that a wake-up radio (WUR) should be enabled, determining whether requirements for radio resource management (RRM) measurements for a serving cell are to be relaxed, wherein the relaxation comprises a reduction in a frequency of the serving cell measurements, enabling the WUR and powering down a main radio (MR) and periodically powering on the MR when the serving cell measurements are to be performed in accordance with the relaxed serving cell measurement requirements.

DETAILED DESCRIPTION

Figure 1:
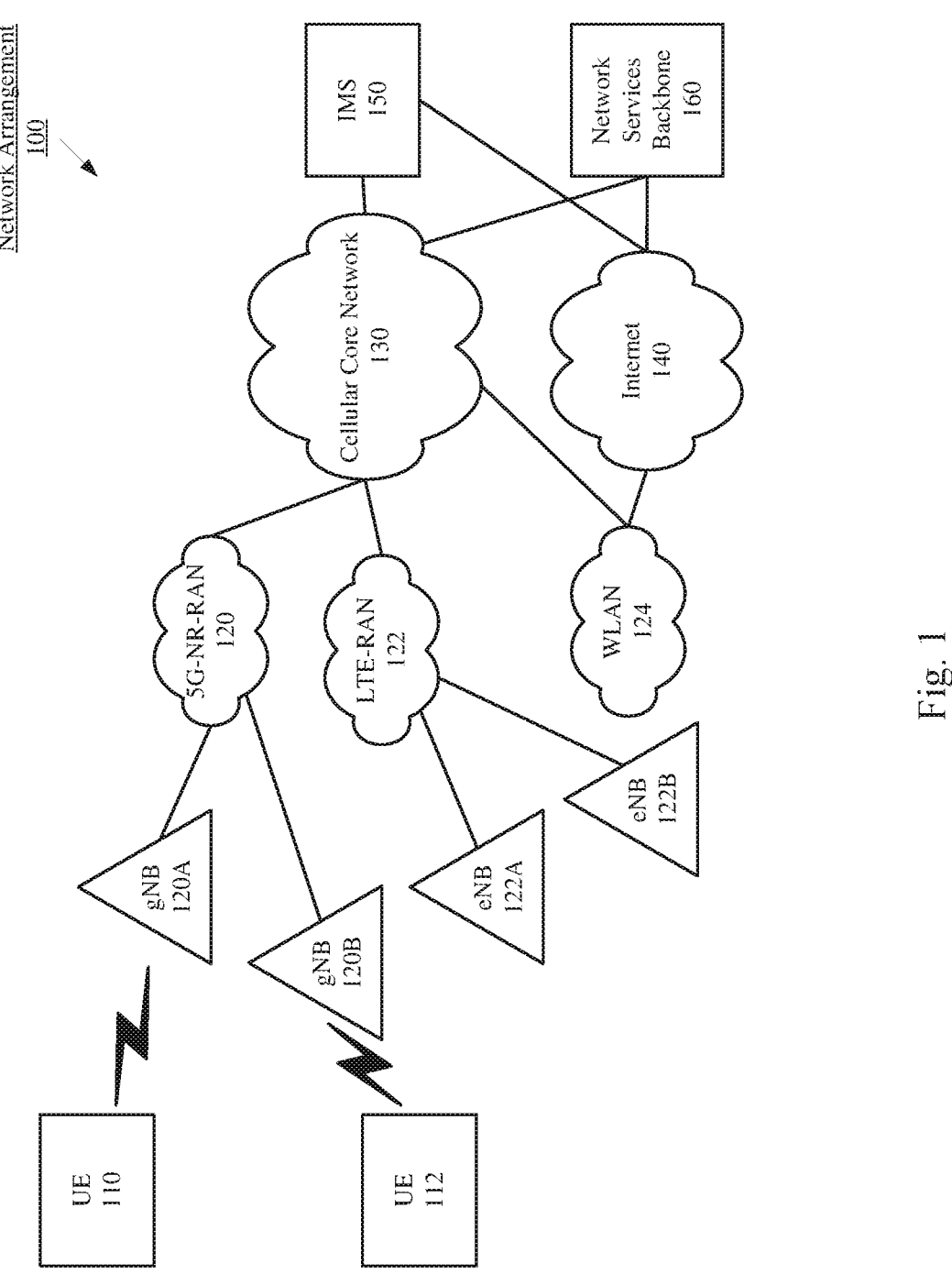
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to a low-power wakeup radio (WUR) for a user equipment (UE) that may be enabled in scenarios where a main radio (MR) of the UE can be powered off. A UE may enter a WUR state from any one of the existing radio resource control (RRC) states, wherein the UE in the WUR state is capable of performing limited signal processing operations with the WUR including, for example, receiving a WUR wakeup signal (WUR-S), and powering up the MR from a very low power or powered off mode. According to some aspects of the present disclosure, the WUR may be enabled by a network base station and triggered by a signal, while in other aspects the UE may autonomously or semi-autonomously enter and exit the WUR operating state.

According to some exemplary embodiments, a WUR architecture is enabled for a UE to enter and exit the WUR state from the RRC_CONNECTED state, while in other embodiments a WUR architecture is enabled for the UE to enter and exit the WUR state from the RRC_IDLE or RRC_INACTIVE states. In all embodiments, the WUR is designed to be a lower-power operating state than any of the existing RRC states. According to some aspects, operations are described to support the configuration and triggering of the UE to enter or exit the WUR state. In other aspects, operations are described to support radio resource management (RRM) measurements for serving cells and neighbor cells for mobility when the WUR is enabled.

The exemplary embodiments are described with regard to operations performed by a user equipment (UE). However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any appropriate electronic component.

The exemplary embodiments are also described with regard to a 5G New Radio (NR) network. However, reference to a 5G NR network is merely provided for illustrative purposes. The exemplary embodiments may be utilized with any network that can implement a wakeup radio (WUR) architecture for a UE. Therefore, the 5G NR network as described herein may represent any type of network that can implement a WUR architecture for a UE.

FIG. 1 shows an exemplary network arrangement 100 according to various exemplary embodiments. The exemplary network arrangement 100 includes a plurality of UEs 110, 112. Those skilled in the art will understand that the UEs may be any type of electronic component that is configured to communicate via a network, e.g., a component of a connected car, a mobile phone, a tablet computer, a smartphone, a phablet, an embedded device, a wearable, an Internet of Things (IOT) device, etc. It should also be understood that an actual network arrangement may include any number of UEs being used by any number of users. Thus, the example of two UEs 110, 112 is merely provided for illustrative purposes.

The UEs 110, 112 may communicate directly with one or more networks. In the example of the network arrangement 100, the networks with which the UEs 110, 112 may wirelessly communicate are a 5G NR radio access network (5G NR-RAN) 120, an LTE radio access network (LTE-RAN) 122 and a wireless local access network (WLAN) 124. Therefore, the UEs 110, 112 may include a 5G NR chipset to communicate with the 5G NR-RAN 120, an LTE chipset to communicate with the LTE-RAN 122 and an ISM chipset to communicate with the WLAN 124. However, the UEs 110, 112 may also communicate with other types of networks (e.g., legacy cellular networks) and the UE 110 may also communicate with networks over a wired connection. With regard to the exemplary embodiments, the UEs 110, 112 may establish a connection with the 5G NR-RAN 120.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UEs 110, 112 may connect to the 5G NR-RAN 120 via at least one of the next generation nodeB (gNB) 120A and/or the gNB 120B. Reference to two gNBs 120A, 120B is merely for illustrative purposes. The exemplary embodiments may apply to any appropriate number of gNBs. For example, the UEs 110, 112 may simultaneously connect to and exchange data with a plurality of gNBs in a multi-cell CA configuration. The UEs 110, 112 may also connect to the LTE-RAN 122 via either or both of the eNBs 122A, 122B, or to any other type of RAN, as mentioned above. In the network arrangement 100, the UE 110 is shown as having a connection to the gNB 120A, while the UE 112 is shown as having a connection to gNB 120B.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network, e.g., the 5GC for NR. The cellular core network 130 also manages the traffic that flows between the cellular network and the Internet 140.

The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
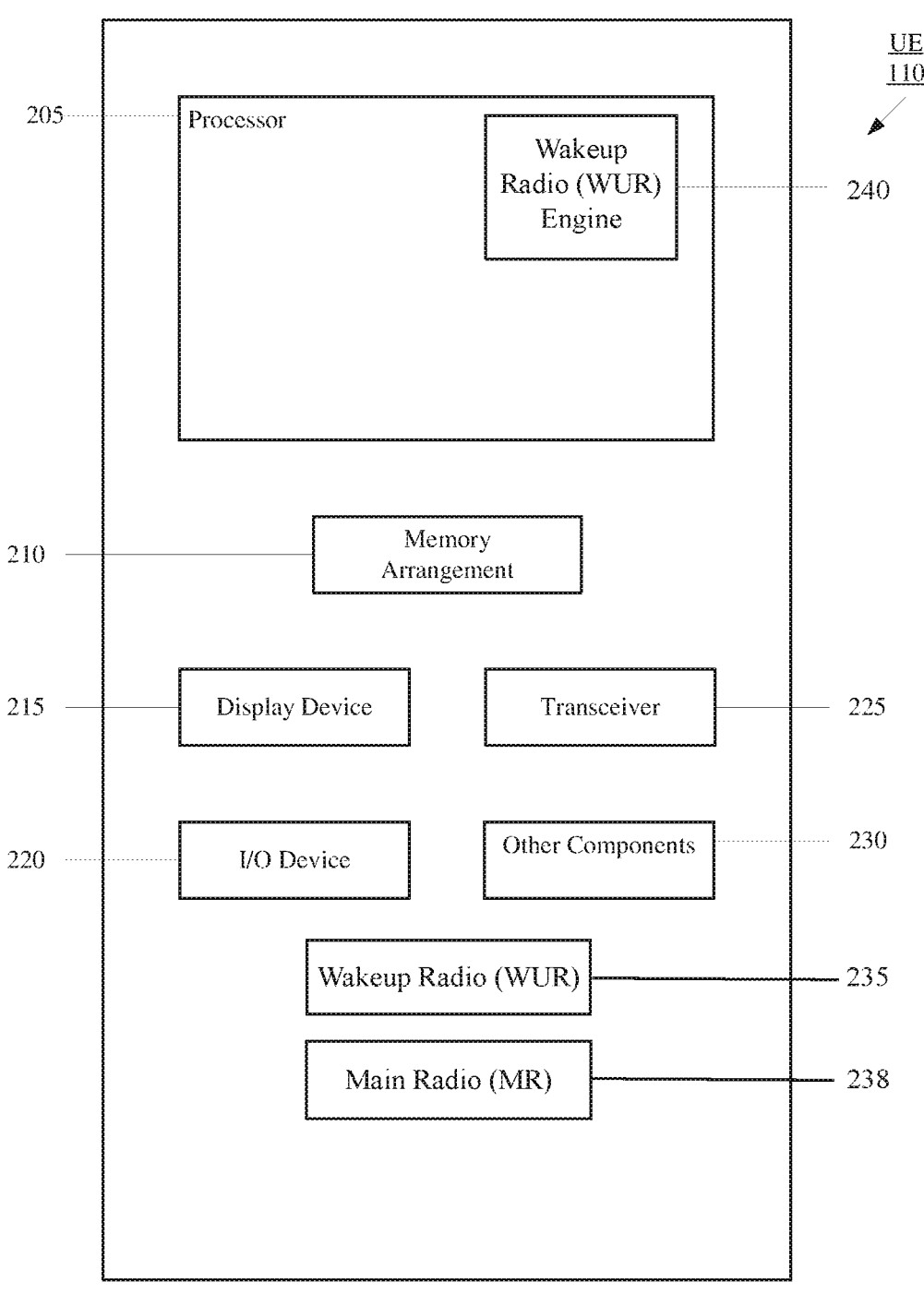
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc. The UE 110 illustrated in FIG. 2 may also represent the UE 112.

The UE 110 additionally includes a wakeup radio (WUR) 235. In the example of FIG. 2, the WUR 235 is shown as a separate hardware component. However, in some exemplary embodiments, the WUR 235 may be a component of the transceiver 225. The transceiver 225 may include the WUR 235 and a main radio (MR) 238. The WUR 235 and MR 238 of the transceiver 225 may be configured to communicate with the 5G-NR RAN 120, the LTE RAN 122, etc. Accordingly, the transceiver 225 may operate on a variety of different frequencies or channels (e.g., set of consecutive frequencies). The MR 238 may be the radio that performs the normal communications associated with the networks such as, but not limited to, connecting with the network, sending and receiving data and control information to/from the network, performing measurements on signals transmitted by network components, etc. However, as described above, there is a high power cost to keeping the MR 238 awake for an extended period of time. The exemplary embodiments introduce the WUR 235 to perform the herein described operations to save power by allowing the MR 238 to enter a lower power state for a period of time.

The WUR 235 and/or the MR 238 may also be components separate from the transceiver 225. The WUR 235 includes a receiver (a wakeup receiver (WURx)) and associated circuitry for performing various limited signal processing operations, to be described in greater detail below. The WUR may operate using an antenna shared with the MR of the transceiver 225 or may operate using a separate antenna designed for use with the WUR 235.

The processor 205 may be configured to execute a plurality of engines for the UE 110. For example, the engines may include a wakeup radio (WUR) engine 240 for performing operations related to enabling/disabling the WUR 235, performing RRM measurements with the WUR 235, and other operations to be described in further detail below.

The above referenced engine being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G-NR RAN 120, the LTE RAN 122 etc. Accordingly, the transceiver 225 may operate on a variety of different frequencies or channels (e.g., set of consecutive frequencies). For example, the transceiver 225 may operate on the unlicensed spectrum when e.g., NR-U is configured.

Figure 3:
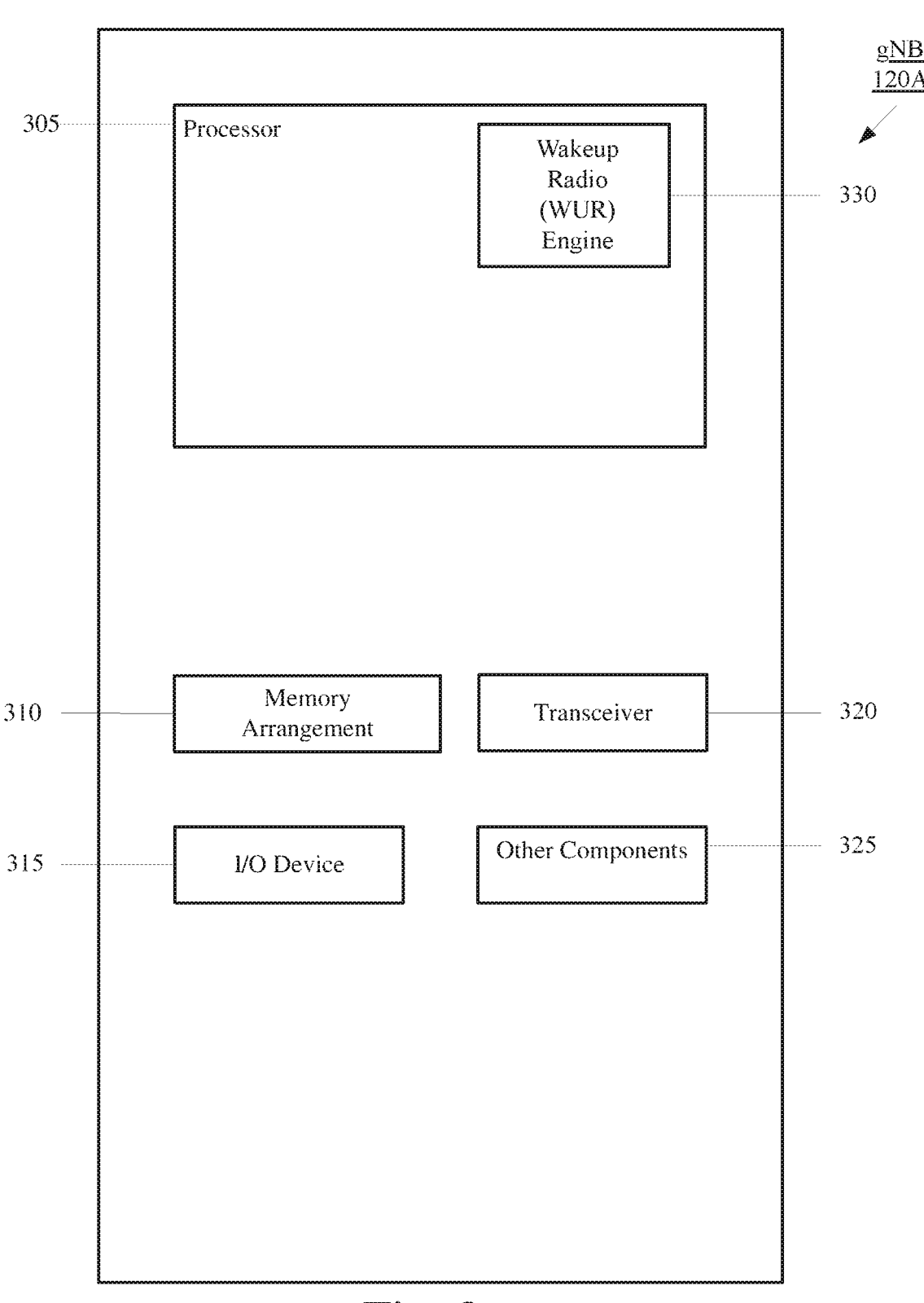
FIG. 3 shows an exemplary network cell according to various exemplary embodiments.

FIG. 3 shows an exemplary network cell, in this case gNB 120A, according to various exemplary embodiments. As noted above with regard to the UE 110, the gNB 120A may represent a cell providing services as a PCell or an SCell, or in a standalone configuration with the UE 110. The gNB 120A may represent any access node of the 5G NR network through which the UEs 110, 112 may establish a connection and manage network operations. The gNB 120A illustrated in FIG. 3 may also represent the gNB 120B.

The gNB 120A may include a processor 305, a memory arrangement 310, an input/output (I/O) device 315, a transceiver 320, and other components 325. The other components 325 may include, for example, an audio input device, an audio output device, a battery, a data acquisition device, ports to electrically connect the gNB 120A to other electronic devices, etc.

The processor 305 may be configured to execute a plurality of engines of the gNB 120A. For example, the engines may include a wakeup radio (WUR) engine 330 for performing operations related to enabling/disabling the WUR 235 for the UE 110, configuring the UE 110 to perform RRM measurements with the WUR 235, and other operations to be described in further detail below.

The above noted engines each being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary embodiments may be implemented in any of these or other configurations of a gNB.

The memory 310 may be a hardware component configured to store data related to operations performed by the UEs 110, 112. The I/O device 315 may be a hardware component or ports that enable a user to interact with the gNB 120A. The transceiver 320 may be a hardware component configured to exchange data with the UEs 110, 112 and any other UE in the network arrangement 100. The transceiver 320 may operate on a variety of different frequencies or channels (e.g., set of consecutive frequencies). For example, the transceiver 320 may operate on unlicensed bandwidths when NR-U functionality is configured. Therefore, the transceiver 320 may include one or more components (e.g., radios) to enable the data exchange with the various networks and UEs.

UE power consumption is a critical issue that directly affects the end user experience and the penetration of 5G, 5G devices, and 5G applications. It is well known that devices operating in a 5G network consume more power than devices operating in an LTE network due to factors such as the support of larger bandwidths, higher throughput and higher frequencies for 5G communications relative to LTE communications. In the RRC_IDLE and RRC_INACTIVE states, a large amount of UE power is consumed in the deep sleep state and while performing RRM measurements.

According to various exemplary embodiments described herein, a low power wake up radio (WUR) is enabled for a UE that allows the main radio (MR) to be fully turned off or to use considerably less power relative to existing methods by entering a low-power state (e.g., a deep sleep state) to deliver a longer battery life. The WUR interface is designed to consume considerably less power compared to the MR and can quickly wake up the MR as soon as the UE needs to resume the use of the MR, e.g., for data communication with a base station.

As described herein, the "wakeup radio" ("WUR") includes a receiver (a wakeup receiver (WURx)) and associated circuitry for performing various limited signal processing operations. It is noted that the WUR as described herein does not include a transmitter (Tx). The WUR may operate using an antenna shared with a main radio (MR) or may operate using a separate antenna designed for use with the WUR. The "WUR state" as described herein may refer to an operating state distinct from the existing radio resource control (RRC) protocol states, wherein only the WUR is used for receiving network signals including, e.g., a WUR signal (WUR-S) to wake up the MR, reference signals to perform RRM measurements, or other signals to be described in detail below. In some embodiments, the WUR state may be entered into directly from the RRC_CONNECTED state, while in other embodiments the WUR state may be entered into from the RRC_INACTIVE or RRC_IDLE states. The WUR state may be considered a state separate from the existing RRC states or may refer to an operating state where the current RRC state is maintained, but network operations are performed only with the WUR while the MR is powered off, to be described in further detail below.

The radio resource control (RRC) protocol comprises a state machine defining an operating state for a UE, each state having different radio resources associated therewith. In 5G NR and, the RRC states include the RRC_CONNECTED state, the RRC_INACTIVE state, and the RRC_IDLE state, while LTE includes the same RRC states, excluding the RRC_INACTIVE state. The UE enters into the RRC_IDLE state upon powering up, and may perform operations including receiving broadcast messages, receiving paging messages, PLMN selection, and cell re-selection mobility. While in the RRC_IDLE state, the UE follows a discontinuous reception (DRX) cycle for periodically waking up to listen for paging messages from the network. The UE may perform an initial access operation, including a random access (RACH) procedure, to camp on a network cell and enter the RRC_CONNECTED state to establish a network connection and exchange transmissions with the network. If, while in the RRC_CONNECTED state, there is no traffic to/from the UE for some predefined period of time, the network may suspend the RRC connection and instruct the UE to enter the RRC_INACTIVE state. In the RRC_INACTIVE state, the UE may perform similar operations as in the RRC_IDLE state. Additionally, the access stratum (AS) context may be saved at the UE and the network, allowing the UE to quickly re-enter the RRC_CONNECTED state using a resume procedure when network activity for the UE is received at the UE/network.

According to certain aspects of the present disclosure, a state model including a new WUR state may be introduced for WUR operation.

Figure 4:
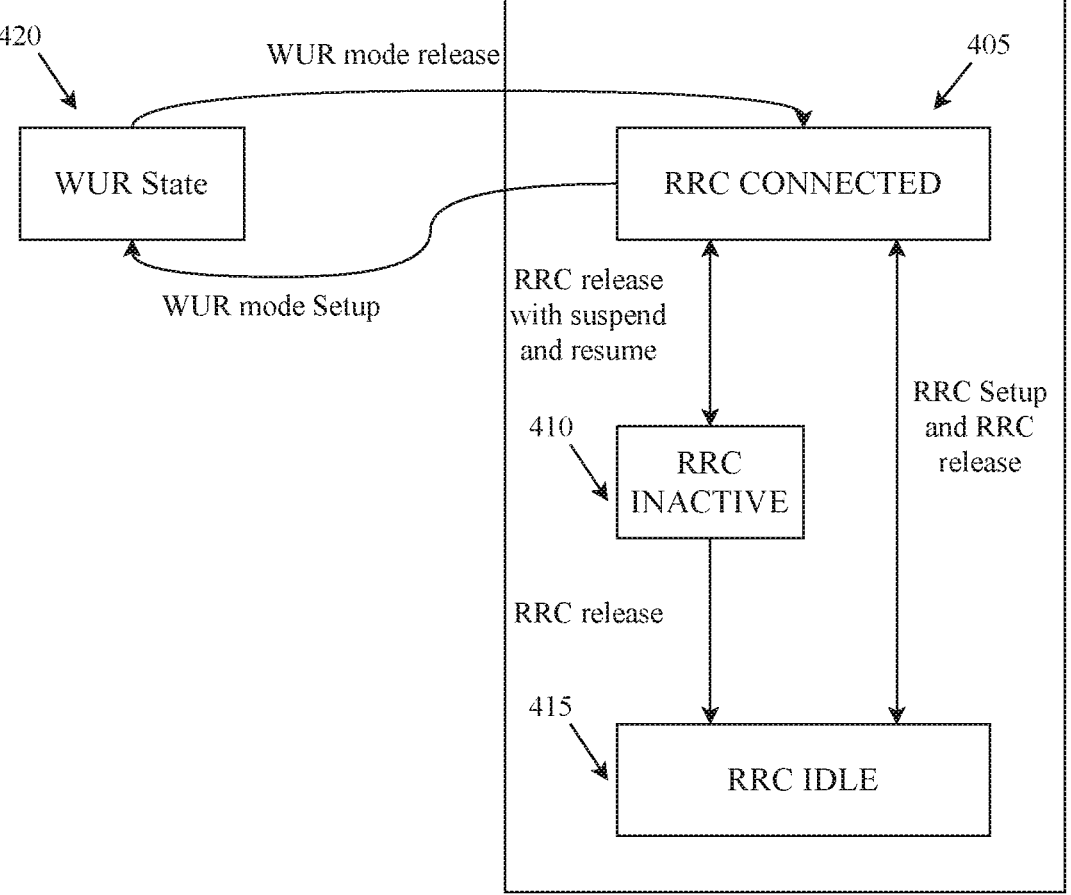
FIG. 4 shows a state model including a wake-up radio (WUR) state according to various exemplary embodiments.

FIG. 4 shows a state model 400 including a wake-up radio (WUR) state 420 according to various exemplary embodiments described herein. In the state model 400, the WUR state 420 is entered into from the RRC_CONNECTED state 405 and exited from by re-entering the RRC_CONNECTED state 405. However, in alternative embodiments, the WUR state 420 may be entered into from other RRC states including the RRC_INACTIVE state 410 and/or the RRC_IDLE state 415. Thus, the exemplary embodiments are not limited to the scenario where the WUR state 420 is entered into from or exited into the RRC_CONNECTED state 405.

In the state model 400 comprising the WUR state 420, the transitions among the existing RRC states (RRC_CONNECTED 405, RRC_INACTIVE 410 and RRC_IDLE 415) are expected to occur primarily during initial access or as a fallback case, e.g., when the WUR for a given UE cannot be used, e.g., due to an out-of-coverage scenario. The transitions between the RRC_CONNECTED state 405 and the WUR State 420, however, are expected to occur relatively often. The power consumption of a UE in the WUR State 420 is expected to be extremely low compared to that of the RRC_CONNECTED state 405, the RRC_INACTIVE state 410 or the RRC_IDLE state 415 to achieve power saving.

The UE comprising the WUR may be triggered to enter the WUR state 420 by receiving a WUR mode setup message from the network, to be described in further detail below. Upon receiving the WUR mode setup message, the UE stores RAN context information that has been obtained during the latest RRC connection setup, e.g., when the UE attaches to the network and/or moves to the RRC_CONNECTED state 405 from the RRC_INACTIVE state 410 or the RRC_IDLE state 415. For example, the UE may store RAN context information including the 5GC-NG-RAN connection (both C/U-planes). Storing the RAN context minimizes the steps and power consumption of the transition from the WUR state 420 to the legacy RRC states when the WUR state 420 is released. Additionally, in some embodiments, the UE may additionally store a core network (CN) context, e.g., a UE access stratum (AS) context such as a security context. In these embodiments, the transitions from the RRC_CONNECTED state 405 to the WUR state 420, and from the WUR state 420 to the RRC_CONNECTED state 405, may be transparent to the CN.

In the WUR state 420, the UE may perform the following operations. In a first operation, the UE may monitor for a WUR signal (WUR-S) for mobile-terminated data initiated by the 5GC. That is, the WUR-S may signal to the UE that a downlink transmission is pending for the UE, e.g., a system information block (SIB), a paging message, or a unicast data message. In a second operation, the UE may perform cell measurements (serving cell and/or neighbor cell measurements) based on WUR-RSs configured by SIB or UE-dedicated signaling from the serving cell of the UE, to be explained in further detail below. In a third operation, the UE implements a WUR DRX operation based on the configured parameters for the WUR signal monitoring to reduce the power consumption. The UE performs WUR-S monitoring and/or WUR-RS reception/measurement in the active time of a WUR DRX cycle. Alternatively, WUR-RS reception/measurement is performed by the UE purely based on the WUR-RS measurement configuration, regardless of the WUR-DRX configuration. The parameters configured for WUR-DRX operation to control the WUR-S monitoring by the UE WUR may include a duration value for active time and cycle value for WUR DRX.

To reduce power consumption, the UE does not perform the following operations in the WUR State 420: PLMN selection, reception of system information (SI) broadcasts, paging for mobile terminated data initiated by 5GC, cell re-selection mobility, or DRX for CN paging configured by NAS.

Figure 5:
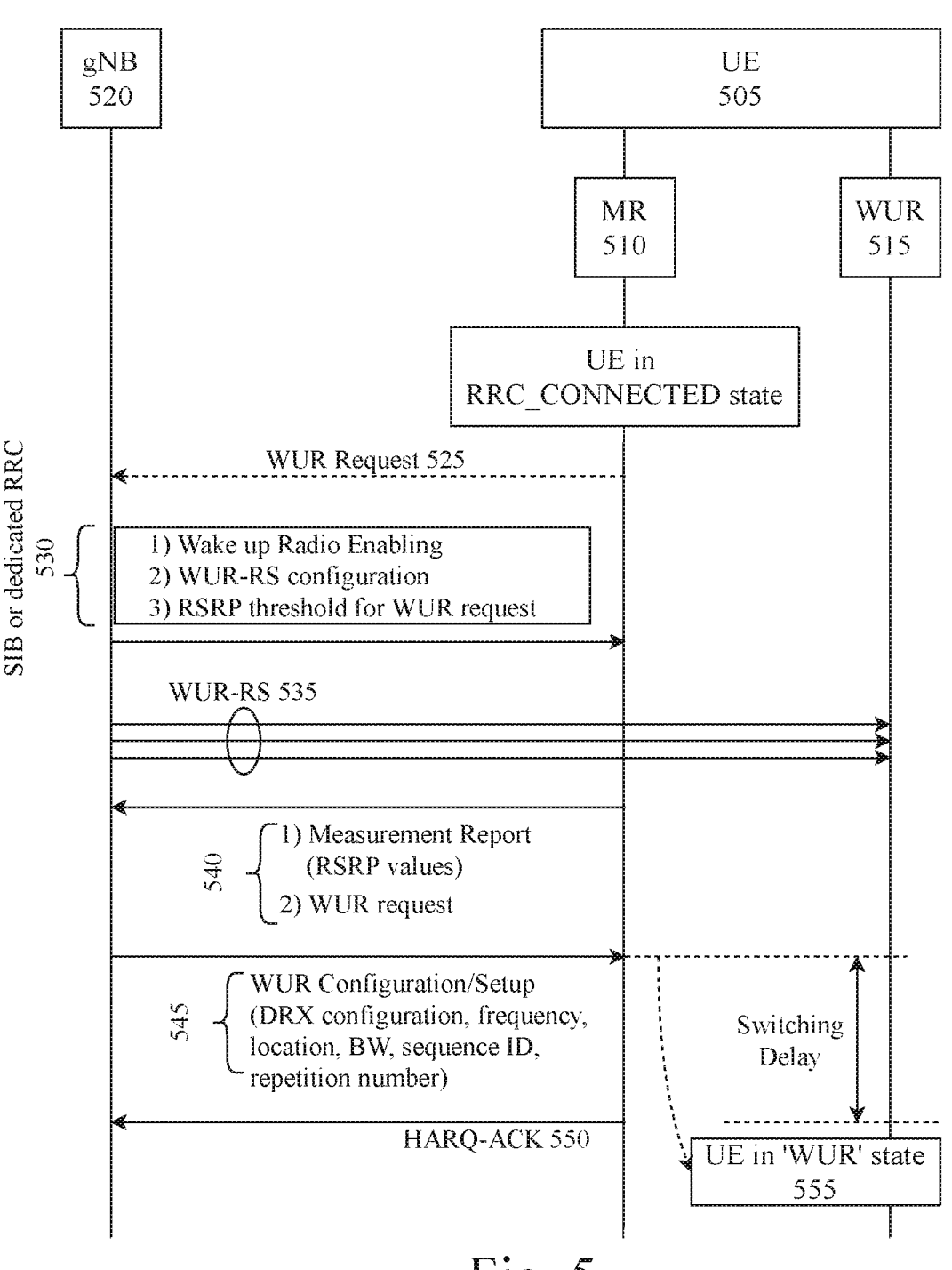
FIG. 5 shows an exemplary signaling diagram for entering into a wakeup radio (WUR) state according to various exemplary embodiments.

FIG. 5 shows an exemplary signaling diagram 500 for entering into a wakeup radio (WUR) state according to various exemplary embodiments described herein. The signaling diagram 500 is described relative to a UE 505 comprising a main radio (MR) 510 and a wakeup radio (WUR) 515. As described above, the MR 510 may be considered a component of the UE transceiver and may include one or more receivers, one or more transmitters, and circuitry for performing network operations in the existing RRC states, while the WUR 515 may comprise only a WUR receiver (WURx) and associated circuitry for performing the various WUR functionalities described above. In some aspects, the WUR may be used in conjunction with the MR 510 to receive certain signals, e.g., WUR-RS, while the UE 505 is in an existing RRC state. The signaling diagram 500 is further described relative to a gNB 520 operating as a serving cell for the UE 505.

In optional 525, the UE 505 sends a WUR request to the gNB 520 using the UE MR 510. The WUR request 525 may be used in scenarios where WUR configuration parameters are provided through dedicated RRC signaling, to be described below in 530. The WUR request 525 may comprise assistance information that the gNB 520 may use to determine whether the request to enable the WUR state should be granted. For example, the assistance information may comprise SS-RSRP measurements, mobility status, throughput profile, traffic profile, etc.

In 530, the UE 505 receives from the gNB 520 (on the MR 510) a set of configuration parameters related to WUR operation. A first parameter that may be received from the gNB 520 is for WUR enabling and indicates whether the WUR operation is enabled for the serving cell. A second parameter that may be received from the gNB 520 is for a WUR Reference Signaling (WUR-RS) configuration and includes a time and frequency resource allocation for the WUR-RS reception, including e.g., a periodicity, a timing offset, and a bandwidth. In some embodiments, to be described below, the WUR-RS may be used to allow measurements by the WUR 515 to determine whether the UE should enter into one of the legacy RRC states (e.g., the RRC_CONNECTED state), for example due to UE mobility.

A third parameter that may be received from the gNB 520 in the WUR configuration parameters is related to a triggering condition for switching from the WUR state to one of the existing RRC states (e.g., the CONNECTED state). This trigger condition may be, for example, an energy threshold (e.g., RSRP threshold) indicating a threshold value wherein, when the RSRP measurements for WUR-RS are below the threshold for some duration, the UE switches to an existing RRC state to, for example, perform mobility measurements using the MR 510.

The WUR configuration may additionally include a configuration for a new WUR-RS-based measurement report that is transmitted upon the occurrence of a triggering event, to be described in further detail below with reference to FIG. 6.

The WUR configuration parameters may be provided to the UE in the following ways. In a first option, the set of WUR-specific parameters may be provided by SIB for all UEs being served by the gNB 520. In the first option, the WUR request described in 525 may not be used. In a second option, the set of WUR-specific parameters may be provided through dedicated RRC signaling after receiving the WUR request in 525 above. For the second option, whether the WUR is enabled for a given UE may be determined by the 5GC Access and Mobility Management Function (AMF). To facilitate the determination, the UE may provide assistance information to the gNB 520 in 525 as described above.

In 535, the UE 505 receives and measures WUR-RS transmitted by the gNB 520 using the UE WUR 515. It is noted that the UE 505 is not yet in the WUR state. However, the UE WUR 515 may be used in the RRC_CONNECTED state for the reception and processing of the WUR-RS. Alternatively, the MR 510 may be used for WUR-RS reception.

In optional 540, assuming the first option of 530 described above is used (where WUR-specific parameters are broadcasted by SIB), the UE 505 may send measurement results, e.g., WUR-RS-RSRP, that are measured by the WUR 515 based on the configured WUR-RS. In addition, a WUR request message may be included and sent to the gNB 520 to request enabling WUR operation. Within the request, the UE 505 may provide some assistance information, e.g., mobility status or throughput profile, to facilitate the gNB decision of WUR enabling.

In 545, the UE 505 may receive from the gNB 520 a set of WUR Signal (WUR-S) configuration parameters. Note that, unlike WUR-RS, a WUR-S hereinafter refers to a signal/sequence that is used by the gNB 520 to trigger the transition at the UE 505 from the WUR state back to the RRC_CONNECTED state. In other words, the WUR-S is used to wake up the UE 505 and corresponds to the WUR state release message described with respect to FIG. 4. The WUR-S may be used to notify the UE 505 to transition to the RRC_CONNECTED state to receive paging messages and/or SIB updates. The WUR-S configuration parameters may include a WUR-specific DRX configuration, a WUR-S repetition number, a resource configuration, etc. The resource configuration may include a time-domain location, e.g., DRX configuration (DRX-On duration, Cycle Period/Offset), a frequency domain location (e.g., Bandwidth, starting PRB relative to Point A of the serving cell), and a sequence ID. If the WUR signal configuration parameters do not include a sequence ID, alternatively, the sequence ID may be implicitly determined based on a unique UE ID e.g., 5G serving temporary mobile subscriber identify (5G S-TMSI).

In 550, when the UE 505 receives the WUR-S configuration of 545 in a given slot 'n', the UE 505 provides HARQ-ACK feedback over the PUCCH for the PDSCH reception in a slot n+k, where k is hard-encoded in specification.

In 555, the UE 505 switches to the WUR state no later than the minimum switching delay requirement defined in the 3GPP specifications and no earlier than 'n+k'.

After the UE 505 has entered the WUR state, the UE 505 performs the WUR operations described above, e.g., monitoring for a WUR-S, performing cell measurements based on WUR-RS receptions, and implementing a WUR-DRX cycle for the WUR-S monitoring. The UE 505 remains in the WUR state until the occurrence of an event that causes the UE 505 to transition back to an existing RRC state (e.g., RRC_CONNECTED).

Figure 6:
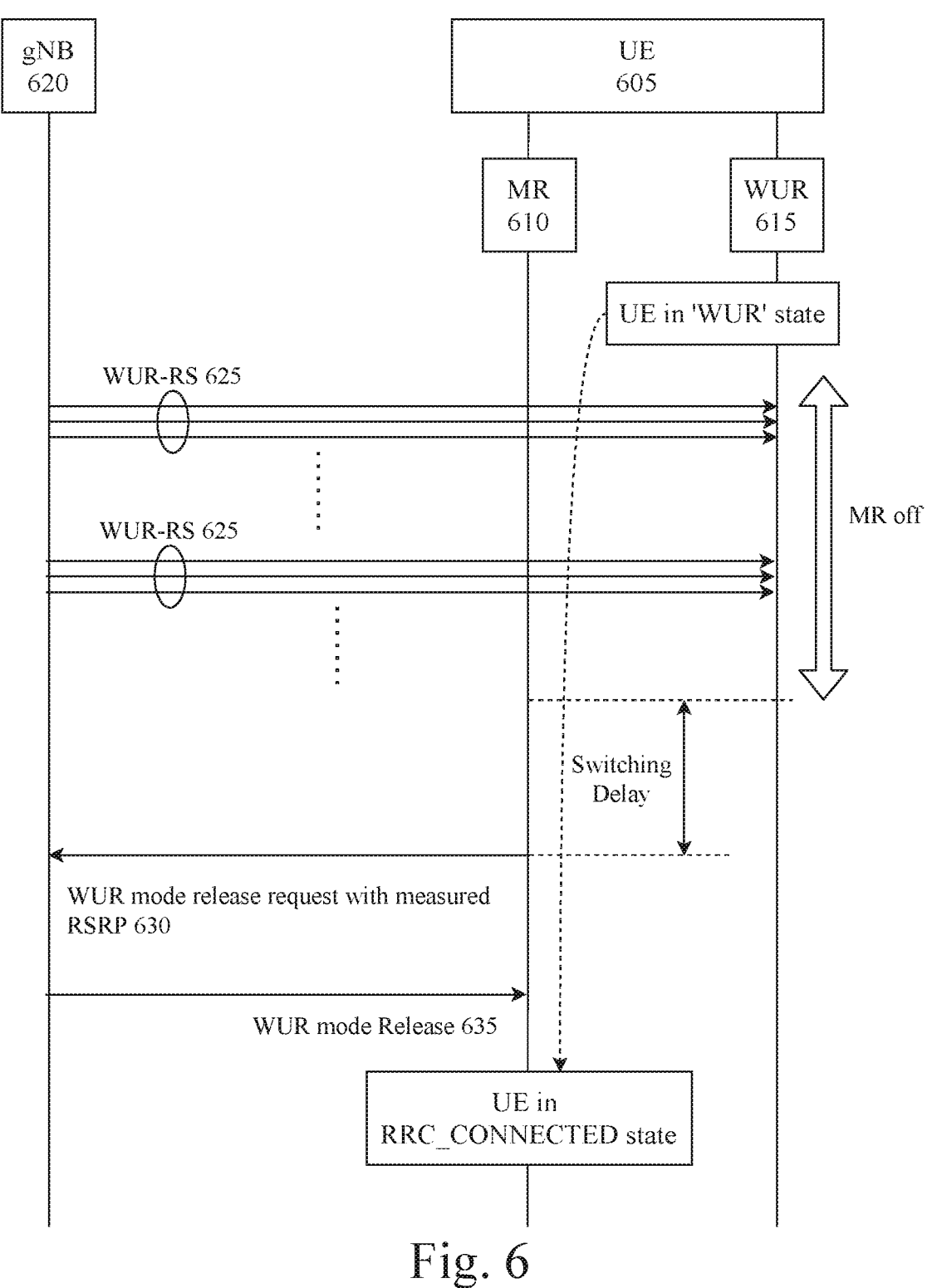
FIG. 6 shows an exemplary signaling diagram for exiting the WUR state according to various exemplary embodiments.

FIG. 6 shows an exemplary signaling diagram 600 for exiting the WUR state according to various exemplary embodiments described herein. The signaling diagram 600 is described relative to a UE 605 comprising a main radio (MR) 610 and a wakeup radio (WUR) 615, and a gNB 620 operating as the serving cell for the UE 605, similar to the UE 505 and gNB 520 described above in the signaling diagram 500 of FIG. 5.

In 530 described above in the signaling diagram 500 of FIG. 5, the WUR configuration may include a new WUR-RS-based measurement report that is transmitted upon the occurrence of a new triggering event referred to herein as "wakeup 1" ("W1"). Alternatively, the measurement report may be transmitted periodically. In some designs, both the triggered reporting and periodic reporting may be used. To transmit this measurement report, the UE 605 may use the MR 610 (e.g., when the WUR 615 does not include a transmitter). Thus, performing the measurement reporting based on the trigger event may allow the UE 605 to keep the MR 610 in the powered off (or very deep sleep) state for a longer duration.

In some designs, the trigger condition of the event W1 may be defined as a number of successive WUR-RS detection failures. For example, a detection failure may comprise a measured RSRP of the WUR-RS (in dBm) being smaller than the configured WUR-RS-RSRP threshold described above in 530 of FIG. 5. The number of successive WUR-RS detection failures may be defined as a threshold N (e.g., N=1), wherein exceeding this number of detection failures triggers the UE 605 to transmit the measurement report. Layer-3 filtering may be applied to filter the measured results before using it for evaluation of Event W1 triggering criteria (e.g., discontinuous transmission (DTX)). The term 'DTX' as used herein refers to a scenario wherein the UE does not receive any traffic (including WUR-RS) from the based station. However, this Layer-3 filtering signal processing would cause additional power consumption and complexity for the design of the WUR 615.

In 625, the UE 605 measures WUR-RS on the WUR 615 during the WUR DRX cycles. As discussed above, in some embodiments, as long as the triggering condition W1 is not fulfilled, the UE 605 may remain in the WUR state with only the WUR 615 enabled and the MR 610 powered off or in a deep sleep state. In another embodiment, when periodic reporting is used, the UE 605 measures the WUR-RS during the period defined for the measurement reporting periodicity.

In 630, the UE 605 switches to the RRC_CONNECTED state when the triggering condition (event W1) is satisfied and transmits the WUR measurement report. The UE 605 includes the eventID 'W1' and the measured RSRP results in the measurement report. The UE 605 may transmit the measurement report and 'WUR mode' release request to gNB 620 using the stored RAN context information, e.g., RNTI.

The general purpose of 630 is to indicate to the network to switch the UE 605 from the 'WUR State' to a legacy RRC state, e.g., RRC_CONNECTED, due to out-of-coverage of the WUR-S, for example, due to mobility.

In 635, the UE 605 receives a response from the gNB 620 including the 'WUR mode' Release Message to confirm the release operation. The gNB 620 performs RN context fetching for the UE 605 and, in the 635, may further provide the UE 605 with the latest RRC configuration by dedicated RRC signaling.

In the following exemplary embodiment, the following procedure may be used to enable UE-triggered transitions from the RRC_CONNECTED state to the WUR state. Previous entering and exiting of the WUR state, may allow the UE to more easily reenter the WUR state. For example, as described below, the UE may have previous WUR-RS measurements that may be used when reentering the WUR state.

Figures 7, 8:
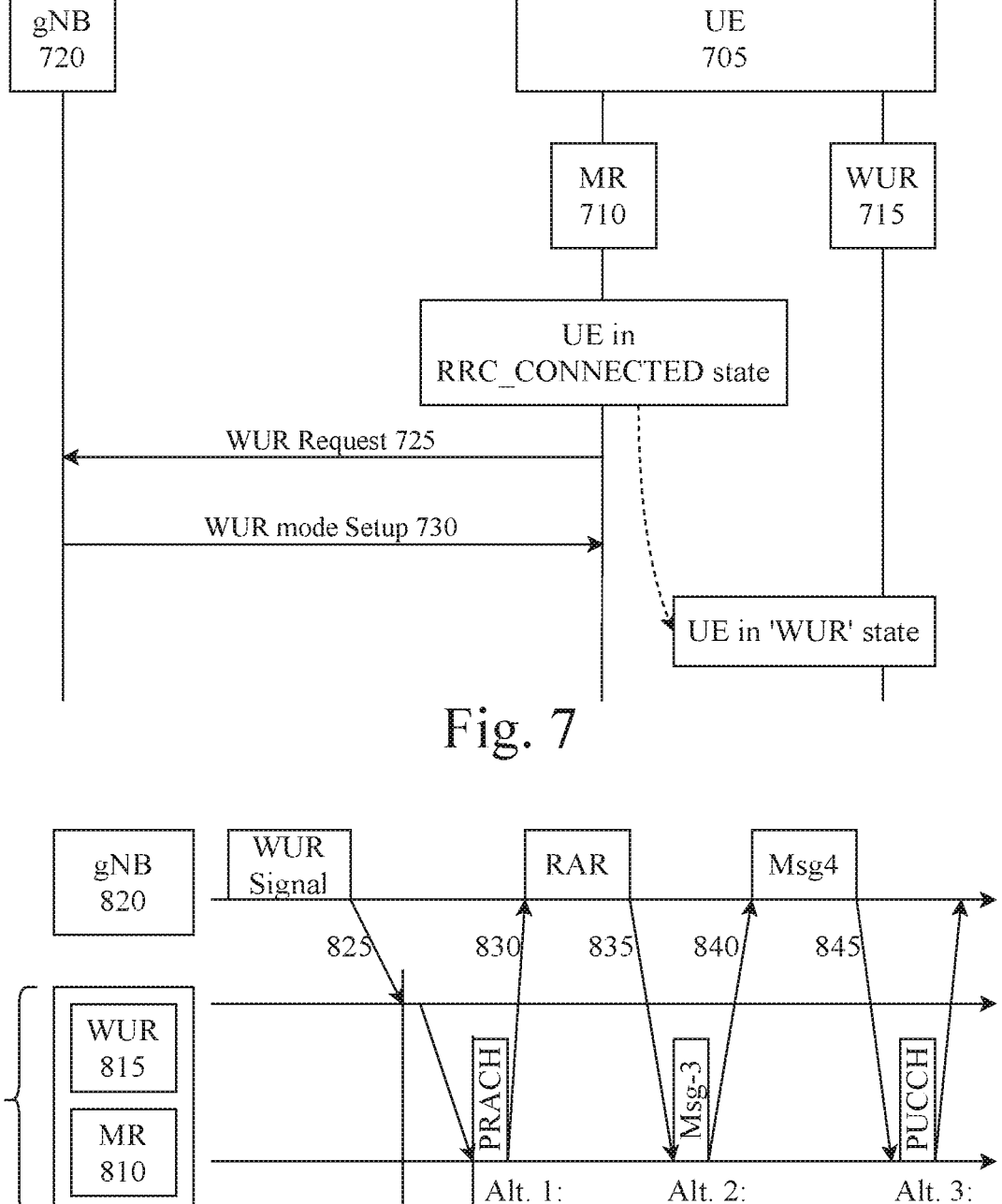
FIG. 7 shows an exemplary signaling diagram for a UE-triggered transition into the WUR state according to various exemplary embodiments.
FIG. 8 shows an exemplary signaling diagram for acknowledging the reception of a wakeup radio (WUR) signal (WUR-S) according to various exemplary embodiments.

FIG. 7 shows an exemplary signaling diagram 700 for a UE-triggered transition into the WUR state according to various exemplary embodiments described herein. The procedure described in the signaling diagram 700 may be used at any time after the initial configuration parameters are provided to the UE 705, as described above in FIG. 5. The signaling diagram 700 is described relative to a UE 705 comprising a main radio (MR) 710 and a wakeup radio (WUR) 715, and a gNB 720 operating as the serving cell for the UE 705, similar to the UE 505 and gNB 520 described above in the signaling diagram 500 of FIG. 5.

In 725, the UE 705 requests to enter the WUR state from the RRC_CONNECTED state. In some exemplary embodiments, the measured WUR-RS-based RSRP/energy results may be included to facilitate the decision of the gNB 720.

In 730, the UE 705 receives a 'WUR mode Setup' message from the gNB 720 to complete the procedure and confirm the transfer to the WUR state. The gNB 720 may also reject the request for various reasons. For example, the gNB 720 may determine that the RSRP results are not sufficiently high enough to warrant a transfer to the WUR state. In another example, the gNB 720 may determine that the DL data buffering at the gNB 720 for transmission to the UE 705 indicates the UE 705 should remain in the RRC-_CONNECTED state.

According to certain aspects of this disclosure, a variety of approaches may be considered for the WUR signal (WUR-S) transmission that notifies the UE to transition out of the WUR state and into an RRC state such as the RRC_CONNECTED state.

In some exemplary embodiments, one WUR-S may be groupcast and directed to all UEs within a certain group to minimize the signaling overhead. For instance, a WUR-S On-Off Key (OOK) sequence may be shared among a group of UEs.

In other exemplary embodiments, a WUR-S may be associated with a unique UE. As one example, the WUR-S may be determined based on the unique UE ID, e.g., 5G-S-TMSI. In another example, a unique WUR-S ID may be assigned by the gNB through dedicated RRC signaling as part of the WUR request response. In some designs, for example during FR2 operation, the UE may be provided with Transmission Control Indicator State (TCI-State) configurations for WUR-RS and WUR-S reception. In particular, a WUR-RS may be served as a QCL 'source signal' for a WUR-S.

According to certain aspects of this disclosure, the following options are available for acknowledging the reception of a WUR-S signal for waking up the MR and entering the RRC_CONNECTED state from the WUR state. The WUR of a UE may receive a WUR-S indicating to power on the MR in slot n, and the UE may confirm the reception of the WUR-S using a variety of L1 Signal/Channels using the MR, to be described below. The confirmation message signals to the gNB that the gNB can start transmissions to the UE under the assumption that the MR is active at the UE side.

The options for acknowledging the WUR-S are described relative to a random access (RA) procedure (RACH procedure). In a typical RACH procedure, the UE sends a PRACH preamble as the first message from the UE to a base station when establishing initial access. In a contention-based random access (CBRA) procedure, the UE transmits the PRACH preamble (e.g., Msg1) with a preamble signature randomly selected by the UE from a pool of preambles shared with other UEs in the cell. In a contention-free RA (CFRA) procedure, the UE uses a dedicated preamble provided by the network specifically for the UE via, for example, RRC signaling or Downlink Control Information (DCI) on the physical downlink control channel (PDCCH). In either procedure, the network responds to the detected RACH preamble (Msg1) with a random access response (RAR) (e.g., Msg2) on physical downlink shared channel (PDSCH) that is scheduled by a PDCCH and includes a resource allocation for a subsequent physical uplink shared channel (PUSCH) transmission by the UE (e.g., Msg3). In CBRA, the network performs a contention resolution procedure and transmits Msg4 based on a UE identifier in the detected Msg3 PUSCH. Repetition techniques may be used by the base station for Msg2 and Msg4 for coverage enhancement (CE).

In some exemplary embodiments, a WUR-S reception is acknowledged with a PRACH-based indication using a Contention-Free (CF) PRACH resource. The UE may be configured with a dedicated PRACH resource to indicate the reception of the WUR-S. For example, a dedicated PRACH resource may be configured by the gNB with a 'PRACH transmission configuration' and a Preamble Index. In these exemplary embodiments, the WUR-S signal serves as a CFRA procedure trigger.

In other exemplary embodiments, a WUR-S reception is acknowledged with a Msg3-based indication using a PUSCH resource in a Contention-Based RACH (CBRA) Procedure. The WUR-S reception acknowledgement may be included in a Msg3 payload. Alternatively, the acknowledgment may be indicated by using a dedicated Logical Channel ID (LCID) of the corresponding MAC SDU e.g., Msg3 to acknowledge the WUR reception.

In still further exemplary embodiments, the UE generates 'ACK' information and transmits it over PUCCH resource $T_{PUCCH}$ in slot 'n+m'. In some designs, $T_{PUCCH}$ may be explicitly configured for a respective UE by the gNB as part of the WUR configuration described above in 525 of FIG. 5. Alternatively, $T_{PUCCH}$ may be determined implicitly by the UE based on the stored C-RNTI or 5G-S-TMSI. The value of 'm' may be configured by RRC signaling in 525 of FIG. 5, wherein 'm' is not smaller than the value reported by UE capability. Alternatively, the 'm' value may be hard-encoded in specification and applied for all UEs with WUR operation in a cell-specific manner.

FIG. 8 shows an exemplary signaling diagram 800 for acknowledging the reception of a wakeup radio (WUR) signal (WUR-S) according to various options described herein. It is noted that the signaling diagram 800 shows multiple distinct options for the acknowledgement, which are not used in conjunction with one another. The signaling diagram 800 is described relative to a UE 805 comprising a main radio (MR) 810 and a wakeup radio (WUR) 815, and a gNB 820 operating as the serving cell for the UE 805, similar to the UE 505 and gNB 520 described above in the signaling diagram 500 of FIG. 5.

In 825, the WUR 815 of the UE 805 receives the WUR-S from the gNB 820. Upon receiving the WUR-S, the UE 805 may enable the MR 810. After a delay for powering the MR 810, the method proceeds to 830.

In 830, the UE 805 transmits a PRACH preamble to the gNB 820 on a PRACH resource (Msg1) using the MR 810. According to the first alternative discussed above, if a Contention-Free (CF) RA procedure is used, an acknowledgement for the reception of the WUR-S may be included in the Msg1. In this alternative, the method for acknowledging the WUR-S ends. However, in other scenarios, the UE 805 may use a contention-based (CB) RA procedure. In these scenarios, Msg1 may not include an acknowledgment for the reception of the WUR-S.

In 835, the UE 805 receives a random access response (RAR) (e.g., Msg2) from the gNB 820 on the MR 810. If CFRA is used, the RACH procedure is complete. If CBRA is used, the method proceeds to 840.

In 840, when CBRA is used, the UE 805 transmits Msg3 to the gNB 820 on a scheduled PUSCH resource. According to the second alternative discussed above, an acknowledgement for the reception of the WUR-S may be included in the Msg3 payload. In another embodiment, the acknowledgment may be indicated by using a dedicated Logical Channel ID (LCID) of the corresponding MAC SDU, e.g., Msg3 to acknowledge the WUR-S reception. In 845, the UE 805 receives Msg4 from the gNB 820 for contention resolution.

In this alternative, the method for acknowledging the WUR-S ends. However, in other scenarios, the acknowledgement may not have been transmitted during the RACH procedure. In these scenarios, a dedicated RRC connection may be established and the method proceeds to 850.

In 850, the UE 805 transmits over a PUCCH resource rPUCCH. According to the third alternative discussed above, the UL transmission may include an acknowledgement for the reception of the WUR-S.

In the following embodiments, a second exemplary WUR is described that includes functionalities similar to the WUR described above with respect to FIGS. 4-8. For example, the second WUR includes a wakeup receiver (WURx) and associated circuitry for performing various limited signal processing operations and does not include a transmitter. Additionally, the WUR state associated with the use of the second WUR may be entered into and exited from any of the existing RRC protocol states, e.g., RRC_CONNECTED, RRC_INACTIVE and RRC_IDLE. However, whereas the first WUR state for the first WUR is described primarily with respect to transitions with the RRC_CONNECTED state, the second WUR state for the second WUR is described primarily with respect to transitions with the RRC_INACTIVE and RRC_IDLE states. For example, some aspects of the second WUR described below relate to serving cell and neighbor cell RRM measurements performed for mobility purposes while the UE is in the IDLE or INACTIVE state. However, it should be understood that the exemplary operations described herein may also be applicable to transitions to/from the RRC_CONNECTED state.

Some operations performed by the second WUR described herein may be similar to those described above with respect to the first WUR. For example, in some aspects, similar signaling may be used for enabling or disabling the WUR state. However, certain aspects of the second WUR described below are described specifically for serving cell and neighbor cell RRM measurements. It should be understood that reference to a first or second WUR is for exemplary purposes only. The exemplary first and second WURs may be used separately or together in a single WUR, and the functionalities described for both WURs may be performed in coordination.

In the current 3GPP standards, RRM measurements are required to be performed periodically for mobility purposes. For example, in 5G NR, for a UE configured with a DRX cycle of 1.28 seconds and above, the UE measures the serving cell at least once every DRX cycle and evaluates the cell selection criterion "S" to decide if the serving cell remains suitable. If the criterion S is not satisfied for two consecutive DRX cycles, the UE initiates measurements of all neighbor cells indicated by the serving cell. If the serving cell fulfills cell re-selection rules for intra-frequency operation, the UE performs intra-frequency RRM measurements. If the serving cell fulfills cell re-selection rules for inter-frequency, the UE performs inter-frequency RRM measurements. Otherwise, the UE performs inter-frequency RRM for high priority frequency layers at least one layer every 60 seconds. With R16 RRM measurement relaxation for idle/inactive UEs, the low-mobility and/or not-at-cell-edge UEs can relax the frequency for neighbor-cell measurement. The serving cell measurement requirement is implicitly tested via the latency test for cell re-selection. This makes it difficult for the UE to do serving cell measurement relaxation by implementation.

If the current RRM measurement requirements are kept after introducing the WUR, the UE would need to wake up the main radio every DRX cycle at least to do serving cell measurements, which impacts the UE power savings that are to be effectuated by the WUR. Therefore, there is a need to handle RRM measurements properly when the WUR is enabled, including the handling of both serving cell measurements and neighbor cell measurements (intra-frequency and inter-frequency).

It is important to maintain the mobility management of UEs in idle/inactive states in cellular communications as long as the UE is not stationary. This is achieved by RRM measurement requirements. If a UE needs to wake up the main radio frequently to perform RRM measurements, the LP WUR does not provide much power saving gain, if any. Moreover, the wake-up signal (WUS) for the WUR may not be able to provide full coverage within a cell, and whether to enable the WUR also depends on the RF condition of the UE. This implies that at least for non-stationary UEs, the WUR should be enabled only when certain conditions are satisfied (assuming the gNB enables the support of WUR for the UE). The following exemplary embodiments describe solutions for how to handle RRM measurements with the WUR to maximize the UE power saving while maintaining sufficient service continuity for idle/inactive UEs.

The following options are available with respect to enabling the WUR.

In a first option, the UE may autonomously determine whether to enable the WUR or not (i.e., the UE is allowed to enter the WUR state). The UE, by implementation, may determine whether to enable the WUR or not based on various considerations such as mobility, serving cell measurements, traffic characteristics, etc. For example, the UE may determine to enable the WUR when it has low mobility, serving cell signal strength/quality is sufficiently good, and/or downlink traffic comes infrequently, and thus the main radio will be woken up infrequently. The UE may also notify the gNB when the WUR is enabled and/or disabled.

In a second option, the UE may report measurements to the gNB and the gNB sends signaling to the UE to enable/disable the WUR. The type of measurements to report, and the corresponding signals for the UE to perform the measurements, may be configured by the gNB. This configuration may be reused from the configurations for serving cell and neighbor cell measurements. The gNB may additionally configure the parameters for the UE to determine when to send the report. For example, thresholds for signal strength/quality, mobility, etc., may be defined.

In a third option, the gNB may configure parameters for the UE, and the UE determines whether/when to enable the second WUR based on the configured parameters. The UE may also notify the gNB when the WUR is enabled and/or disabled. The configurable parameters for the UE to determine whether to enable the WUR may include parameters to determine one or more thresholds for signal strength/quality, mobility, etc.

For the second and third options, where the gNB configures WUR parameters for the UE, the configurable parameters may be broadcast in a SIB, or carried in UE-specific signaling. For the first and third options, where the UE autonomously or semi-autonomously determines whether/when to enable the WUR, if the UE does not notify the gNB, then the gNB may be unaware of whether the WUR is enabled at the UE, and whether the UE is in the WUR state or an existing RRC state (e.g., IDLE or INACTIVE). Thus, to notify the UE that it should wakeup, e.g., enter the RRC_CONNECTED state, the gNB may transmit both a WUR-S(for receipt by the WUR) and the legacy paging (for receipt by the MR).

With regard to the UE handling of serving cell measurements during WUR operation, the following options are available.

According to the first option, the UE may wake up the main radio every few cycles to do the serving cell measurement. To enable the first option, the current serving cell measurement requirements may be relaxed. Conditions may be defined for when such a relaxation can be applied, according to one or more of the following alternatives.

In a first alternative, the UE autonomously determines whether to relax of the serving cell measurement requirements. In the first alternative, there is no signaling required for the UE to relax the measurement requirements, however the network is prevented from having control over the measurement requirement relaxation.

In a second alternative, the UE receives signaling from the gNB to allow relaxation. The gNB may determine whether to allow relaxation based on measurements reported by the UE. In the second alternative, the network has control over the measurement requirement relaxation, however this requires the idle/inactive UE to communicate regularly with the gNB for the gNB to determine whether relaxation is allowed, thus reducing UE power savings.

In a third alternative, the gNB configures some parameters for the UE, and the UE determines whether/when to relax the serving cell measurements based on the configured parameters. The configurable parameters may include parameters to determine the thresholds for signal strength/quality, mobility, etc. For example, the UE may determine to relax the serving cell measurement requirements when the signal strength/quality for the camped cell is sufficiently strong, or when the UE speed is below some configured threshold. The third alternative may be preferable for idle/inactive UEs because the UE does not need to communicate with the gNB when determining whether to relax the serving cell measurement requirement. When the third alternative is used, the configurable parameters may be broadcast to multiple UEs, e.g., in a SIB message, or transmitted to a UE via dedicated RRC signaling before the UE enters the idle/inactive state.

In a fourth alternative, the relaxation is allowed whenever the WUR is enabled. The fourth alternative may be preferable when proper conditions are defined to enable the WUR, e.g., for the second and third options for WUR enablement discussed above, where the gNB configures some WUR parameters for the UE.

In a second option for serving cell measurements, some or all of the serving cell measurements may be supported by the WUR. To enable serving cell measurements by the WUR, a new signal (s) may be introduced and a new serving cell measurement requirement may be defined to replace the current requirements. In some embodiments, serving cell measurement by the WUR may be enabled whenever the WUR is enabled. For example, a sequence based WUR measurement signal may be appropriate to enable a simple receiver (WURx) design for the WUR and lower power consumption. Examples include a simple on-off sequence, sequences similar to SS or RS in NR, or any other new sequence design. The configuration of the signals for serving cell measurements by the WUR can be provided in broadcast messages such as a SIB, or a UE-specific message before the UE enters the idle/inactive state.

Serving cell measurements by the WUR can be used to replace or complement the serving cell measurement by the MR. The following alternatives are available for enabling serving cell measurements by the WUR.

In a first alternative, the serving cell measurement can be done solely by the WUR, and it is no longer required for the UE to perform the legacy serving cell measurement by the main radio. This alternative may be used when the serving cell measurement by the WUR is sufficiently reliable/accurate to satisfy measurement standards.

In a second alternative, the WUR wakes up the main radio to perform serving cell measurement when the serving cell measurement performed by the WUR meets certain conditions. This alternative may be used when the serving cell measurement by the WUR is not sufficiently reliable/accurate. The parameters for the measurement conditions (e.g., SINR threshold, offset, etc.) may be configured by the gNB.

In this scenario, a tighter condition can be set for the WUR, and the main radio can be woken up to perform more accurate measurements. After the main radio is woken up to perform serving cell measurements, there may be further conditions defined for the UE to fall back to serving cell measurements being performed by the WUR. For example, the UE may return to using the WUR for serving cell measurements when the measured RSRP/RSRQ is above a certain threshold. It is noted that this alternative may be used in combination with the first option for serving cell measurements discussed above, where the measurement performed by the MR is further relaxed to be once every few cycles.

With regard to the UE handling of neighbor cell measurements during WUR operation, the following options are available.

According to a first option, the neighbor cell measurement is performed by the MR, and triggered by the serving cell measurement by the MR, similar to existing methods. However, according to the first option, the neighbor cell measurement is further relaxed. This option for neighbor cell measurements may be implemented together with the first option discussed above for serving cell measurements, where the serving cell measurement requirements are also relaxed, or with the second alternative of the second option discussed above for serving cell measurements, where the WUR wakes up the MR when the serving cell measurements performed by the WUR are not sufficiently reliable.

In one example, instead of requiring neighbor cell measurements every three DRX cycles, the requirement can be relaxed to every X DRX cycles, where X>3. In another example, the extent of relaxation can be dependent on factors such as serving cell measurement and mobility. Multiple values of X may be defined, wherein more relaxation (larger X value) can be allowed when the serving cell measurements are sufficiently reliable and/or in lower mobility scenarios.

In a second option, the WUR wakes up the MR to perform neighbor cell measurements when certain conditions are satisfied. This option may be preferably implemented together with the second alternative of the second option for serving cell measurements discussed above, where the serving cell measurements can be done by WUR alone. The conditions may include mobility and serving cell signal strength/quality.

In a third option, neighbor cell measurements by the WUR are supported. Similar to above, new signals, procedures and configurations may be needed to allow the WUR to perform the neighbor cell measurements. Similar to the second option for neighbor cell measurements above, the third option may be preferably implemented together with the second alternative of the second option for serving cell measurements discussed above, where the serving cell measurements may be performed by WUR alone. In this way, all the RRM measurements may be completely performed by the WUR. If a cell re-selection is triggered, the WUR may wake up the MR to perform the cell acquisition procedure.

To enable neighbor cell measurements by the WUR, a new signal (s) may be introduced and/or a new neighbor cell measurement requirement may be defined to replace the current requirements. For example, a sequence-based WUR measurement signal may be appropriate, such as a simple on-off sequence, sequences similar to SS or RS in NR, or any other new sequence design. In some embodiments, neighbor cell measurement by the WUR can be enabled whenever WUR is enabled. The configuration of the signals for neighbor cell measurements by the WUR may be provided in broadcast messages such as a SIB, or a UE-specific message before the UE enters the idle/inactive state. The configuration may also include a mapping between the signals and the neighbor cells, or a logical index that may be mapped to the neighbor cells.

Figure 9:
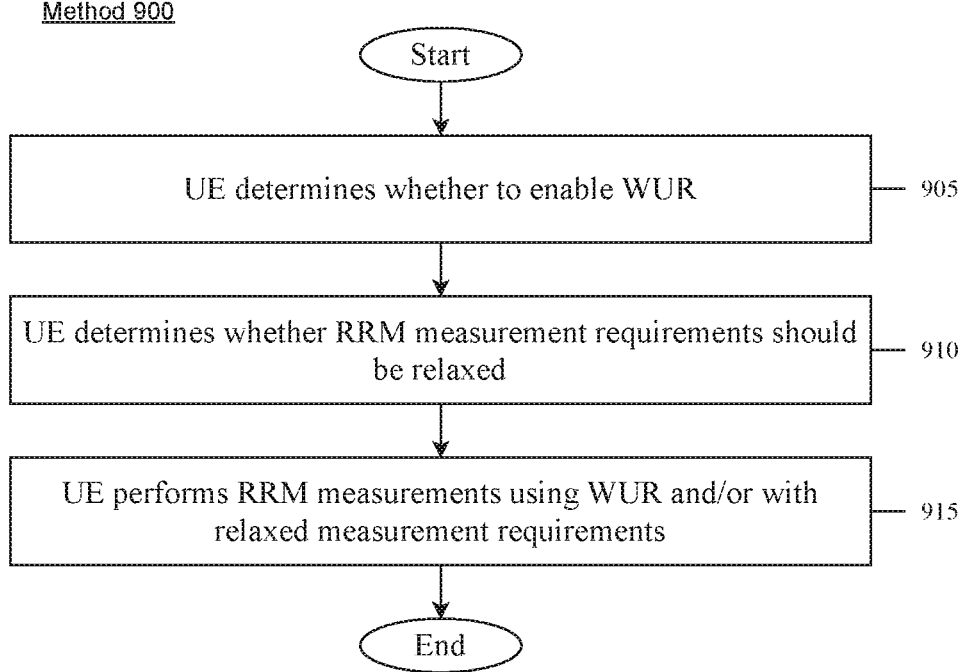
FIG. 9 shows an exemplary method for wakeup radio (WUR) operation for radio resource management (RRC) measurements according to various exemplary embodiments.

FIG. 9 shows an exemplary method 900 for wakeup radio (WUR) operation for radio resource management (RRM) measurements according to various exemplary embodiments described herein.

In 905, the UE determines whether to enable the WUR. The determination may be made autonomously, may be made in response to a signal from the serving cell indicating that the WUR should be enabled, or may be made semi-autonomously (e.g., based on parameters configured by the serving cell). For example, the determination may be based on signal strength/quality thresholds.

In 910, the UE determines whether serving cell or neighbor cell measurements should be relaxed. This determination may be made autonomously, may be made in response to a signal from the serving cell indicating that the WUR should be enabled, may be made semi-autonomously (e.g., based on parameters configured by the serving cell), or may be made automatically whenever the WUR is enabled. For example, the determination may be based on signal strength/quality thresholds.

In 915, the UE performs serving cell and/or neighbor cell measurements using the WUR and/or with relaxed measurement requirements using the MR. The WUR may perform all the RRM measurements, may perform some of the RRM measurements in coordination with the MR, or may enable the MR when the signal strength/quality for signals received by the WUR are not adequate.

EXAMPLES

In a first example, a processor of a base station is configured to perform operations comprising entering a radio resource control (RRC) state with a user equipment (UE), wherein operations are performed by the UE using a main radio (MR), transmitting a first set of parameters to the UE for wake-up radio (WUR) state operation wherein the UE enables a WUR and powers down the MR to an off state or to a deep sleep state with reduced power consumption, the first set of parameters including a parameter enabling the WUR state operation for the UE and a configuration for WUR reference signaling (WUR-RS) and transmitting a second set of parameters to the UE for WUR setup and a WUR signal (WUR-S) configuration.

In a second example, a processor of a user equipment (UE) is configured to perform operations comprising determining that a wakeup radio (WUR) should be enabled, enabling the WUR and powering down a main radio (MR) and performing radio resource management (RRM) measurements for a serving cell based at least in part on signals received by the WUR while the WUR is enabled.

In a third example, the processor of the second example, wherein the determination that the WUR should be enabled is autonomously determined by the UE.

In a fourth example, the processor of the third example, wherein the autonomous determination by the UE is based on low mobility, a serving cell signal strength or quality, or downlink traffic characteristics.

In a fifth example, the processor of the fourth example, wherein the operations further comprise notifying the serving cell when the WUR is enabled or disabled.

In a sixth example, the processor of the second example, wherein the determination that the WUR should be enabled is based on a signal from the serving cell.

In a seventh example, the processor of the sixth example, wherein the operations further comprise receiving a measurement report configuration from the serving cell and determining to send the measurement report based on configured parameters, wherein the serving cell determines whether to enable the WUR based on the measurement report and notifies the UE.

In an eighth example, the processor of the seventh example, wherein the configured parameters include a threshold for signal strength, signal quality or mobility.

In a ninth example, the processor of the sixth example, wherein the signal comprises reference signal (RS) measurement parameters for the UE to determine whether to enable the WUR, wherein the UE determines to enable the WUR based on determined RS measurements compared to a threshold for signal strength, signal quality or mobility.

In a tenth example, the processor of the second example, wherein the operations further comprise receiving a WUR configuration from the serving cell in a system information block (SIB) or in UE-specific signaling.

In an eleventh example, the processor of the second example, wherein the operations further comprise performing the serving cell measurements solely with the WUR without powering on the MR.

In a twelfth example, the processor of the second example, wherein the operations further comprise performing first serving cell measurements with the WUR, when the first serving cell measurements meet one or more conditions, powering on the MR and performing second serving cell measurements with the MR.

In a thirteenth example, the processor of the twelfth example, wherein the one or more conditions include a signal to noise and interference (SINR) ratio threshold.

In a fourteenth example, the processor of the twelfth example, wherein the operations further comprise powering down the MR and performing third serving cell measurements with the WUR when a further one or more conditions are met.

In a fifteenth example, the processor of the fourteenth example, wherein the further one or more conditions include a reference signal received power (RSRP) or reference signal received quality (RSRQ) being above a threshold.

In a sixteenth example, the processor of the second example, wherein the operations further comprise performing radio resource management (RRM) measurements for a neighbor cell based at least in part on signals received by the WUR while the WUR is enabled.

In a seventeenth example, the processor of the sixteenth example, wherein the WUR powers on the MR to perform the neighbor cell measurements when one or more conditions are met.

In an eighteenth example, the processor of the seventeenth example, wherein the one or more conditions include a threshold for signal strength, signal quality or mobility.

In a nineteenth example, the processor of the sixteenth example, wherein the operations further comprise performing the neighbor cell measurements solely with the WUR without powering on the MR.

In a twentieth example, the processor of the nineteenth example, wherein the operations further comprise powering on the MR when cell reselection is triggered.

In a twenty first example, the processor of the second example, wherein the signals used to perform the serving cell measurements and neighbor cell measurements with the WUR include sequence-based signals.

In a twenty second example, the processor of the twenty first example, the processor of the sixteenth example, wherein the sequence-based signals comprise an on-off sequence.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. A processor of a user equipment (UE) configured to perform operations comprising:

entering a radio resource control (RRC) state with a base station;

receiving a first set of parameters from the base station for a wakeup radio (WUR) state wherein the UE enables a WUR and powers down a main radio (MR) to an off state or to a deep sleep state with reduced power consumption, the first set of parameters including a parameter enabling the WUR state for the UE, a configuration for a WUR reference signal (WUR-RS) and a trigger condition for the UE to switch from the WUR state to the RRC State, wherein the trigger condition is based on a reference signal received power (RSRP) threshold;

receiving a second set of parameters from the base station for a WUR setup and a configuration for a WUR signal (WUR-S); and entering the WUR state from the RRC state, wherein, while in the WUR state, the UE performs, using the WUR, at least one of monitoring for the WUR-S, measuring the WUR-RS, or implementing a WUR discontinuous reception (DRX) cycle.

2. The processor of claim 1, wherein the trigger condition comprises a signal energy threshold for WUR-RS measurements, wherein, when a signal energy is below the signal energy threshold, the UE switches from the WUR state to the RRC state.

3. The processor of claim 1, wherein the first set of parameters are received in a system information block (SIB) or via dedicated RRC signaling.

4. The processor of claim 1, wherein the configuration for the WUR-S includes a repetition number for the WUR-S, a time domain location for the WUR-S, and a frequency domain location for the WUR-S.

5. The processor of claim 4, wherein the configuration for the WUR-S further comprises a sequence ID for the WUR-S.

6. The processor of claim 1, wherein the operations further comprise:

transmitting a WUR request to the base station, wherein the WUR request includes assistance information used by the base station to determine whether the WUR state is enabled, wherein the assistance information comprises RSRP results that are measured by the WUR of the UE, a mobility status of the UE, a throughput profile or a traffic model profile.

7. The processor of claim 1, wherein the operations further comprise:

transmitting an acknowledgement for the receiving of the second set of parameters, wherein the acknowledgement is HARQ-ACK feedback transmitted over a physical uplink control channel (PUCCH) in slot n+k, wherein the second set of parameters from the base station is received over a physical downlink shared channel (PDSCH) in slot n and a value of k is hard-encoded in specification.

8. The processor of claim 1, wherein the UE is further configured with a WUR-RS based measurement report, wherein the WUR-RS based measurement report is transmitted based on a trigger event or periodically.

9. The processor of claim 1, wherein the operations further comprise:

transitioning from the WUR state to the RRC state.

10. The processor of claim 1, wherein entering the WUR state comprises powering down a main radio (MR) or switching the MR into a deep sleep state.

11. A method, comprising:

at a user equipment (UE):

entering a radio resource control (RRC) state with a base station;

receiving a first set of parameters from the base station for a wakeup radio (WUR) state wherein the UE enables a WUR and powers down a main radio (MR) to an off state or to a deep sleep state with reduced power consumption, the first set of parameters including a parameter enabling the WUR state for the UE, a configuration for a WUR reference signal (WUR-RS) and a trigger condition for the UE to switch from the WUR state to the RRC State, wherein the trigger condition is based on a reference signal received power (RSRP) threshold;

receiving a second set of parameters from the base station for a WUR setup and a configuration for a WUR signal (WUR-S); and entering the WUR state from the RRC state, wherein, while in the WUR state, the UE performs, using the WUR, at least one of monitoring for the WUR-S, measuring the WUR-RS, or implementing a WUR discontinuous reception (DRX) cycle.

12. The method of claim 11, wherein the trigger condition comprises a signal energy threshold for WUR-RS measurements, wherein, when a signal energy is below the signal energy threshold, the UE switches from the WUR state to the RRC state.

13. The method of claim 11, wherein the first set of parameters are received in a system information block (SIB) or via dedicated RRC signaling.

14. The method of claim 11, wherein the configuration for the WUR-S includes a repetition number for the WUR-S, a time domain location for the WUR-S, and a frequency domain location for the WUR-S.

15. The method of claim 14, wherein the configuration for the WUR-S further comprises a sequence ID for the WUR-S.

16. The method of claim 11, further comprising:

transmitting a WUR request to the base station, wherein the WUR request includes assistance information used by the base station to determine whether the WUR state is enabled, wherein the assistance information comprises reference signal received power (RSRP) results that are measured by the WUR of the UE, a mobility status of the UE, a throughput profile or a traffic model profile.

17. The method of claim 11, further comprising:

transmitting an acknowledgement for the receiving of the second set of parameters, wherein the acknowledgement is HARQ-ACK feedback transmitted over a physical uplink control channel (PUCCH) in slot n+k, wherein the second set of parameters from the base station is received over a physical downlink shared channel (PDSCH) in slot n and a value of k is hard-encoded in specification.

18. The method of claim 11, wherein the UE is further configured with a WUR-RS based measurement report, wherein the WUR-RS based measurement report is transmitted based on a trigger event or periodically.

19. The method of claim 11, further comprising:

transitioning from the WUR state to the RRC state.

* * * * *